United States Patent
Sato et al.

(10) Patent No.: US 7,216,393 B2
(45) Date of Patent: May 15, 2007

(54) OPTICAL CONNECTOR CLEANING DEVICE

(75) Inventors: Daisuke Sato, Yokohama (JP); Sadao Tomioka, Otsu (JP); Yoshiteru Kiyomura, Shiga (JP); Iwao Watanabe, Kodaira (JP); Kouji Ueno, Iruma (JP)

(73) Assignee: Toray Industries, Inc. (JP)

( * ) Notice: Subject to any disclaimer, the term of this patent is extended or adjusted under 35 U.S.C. 154(b) by 493 days.

(21) Appl. No.: 10/221,542

(22) PCT Filed: Jan. 10, 2002

(86) PCT No.: PCT/JP02/00071

§ 371 (c)(1),
(2), (4) Date: Oct. 8, 2002

(87) PCT Pub. No.: WO02/057825

PCT Pub. Date: Jul. 25, 2002

(65) Prior Publication Data

US 2003/0126707 A1    Jul. 10, 2003

(51) Int. Cl.
*A47K 7/02* (2006.01)
(52) U.S. Cl. .................. 15/210.1; 15/104.04; 15/220.4; 15/256.5; 15/256.6
(58) Field of Classification Search ................ 15/97.1, 15/209.1, 210.1, 231
See application file for complete search history.

(56) References Cited

U.S. PATENT DOCUMENTS 5,117,528 A * 6/1992 Kanayama et al. ........ 15/210.1
5,735,013 A * 4/1998 Yaguchi et al. ............ 15/210.1
6,047,716 A * 4/2000 Shimoji et al. ........... 134/166 C
6,191,922 B1 * 2/2001 Shimada et al. ............ 360/137
6,619,857 B2 * 9/2003 Miyake ....................... 385/85

FOREIGN PATENT DOCUMENTS

JP    06-242347    * 9/1994

OTHER PUBLICATIONS

Machine English Translation of JP 06-242347.*

* cited by examiner

*Primary Examiner*—David Redding
(74) *Attorney, Agent, or Firm*—DLA Piper US LLP

(57) ABSTRACT

The present invention relates to an optical-connector cleaning device, wherein an outer casing has an openable and closable window, through which a cleaning tape for cleaning fiber end surface of the optical connectors is gradually fed.

The optical-connector cleaning device according to the invention includes a cassette for integrally holding a reel for feeding unused cleaning tape and a reel for taking up the used cleaning tape, wherein the cassette can be attached to and detached from the outer casing, thus facilitating the replacement of the cleaning tape.

Furthermore, in the optical-connector cleaning device according to the invention, a replacement unit including a guide plate for guiding the fiber end surface of the optical connector and a rubber pad serving as a base for the cleaning tape can be detachably disposed at a position corresponding to the window in the outer casing, thus facilitating the cleaning of optical connectors having different shapes.

11 Claims, 8 Drawing Sheets

OPTICAL CONNECTOR CLEANING DEVICE

TECHNICAL FIELD

The present invention relates to an optical-connector cleaning device for cleaning fiber end surface when connecting optical connectors and, more particularly, relates to an optical-connector cleaning device that facilitates replacement of cleaning tape and the cleaning of optical connectors of various shapes.

BACKGROUND ART

Recently, a communication network using optical fibers has been developed as high-speed high-capacity communication means. Various optical connectors are used for optical fiber connections when installing optical fibers or at the manufacturing sites of optical-fiber communication devices. Since optical connectors generally employ a method of bringing the end faces of optical fibers into direct contact with each other, contaminants on the fiber end surface cause deterioration of connection characteristics. Therefore, the fiber end surface must be cleaned before connecting the optical connectors.

Conventionally, an optical-connector cleaning device has been proposed, as disclosed in Japanese Patent Application Publication No. 6-242347, which includes an openable and closable window in an outer casing thereof and gradually feeds the window cleaning tape from a reel for cleaning the fiber end surface of the optical connectors. That cleaning device includes a guide plate for guiding the fiber end surface of the optical connectors to a position corresponding to the window in the outer casing, and a rubber pad serving as a base for the cleaning tape.

However, in the aforesaid cleaning device, when the cleaning tape has been used up, it is necessary to detach the empty reel and a reel which has taken up the used cleaning tape and, thereafter, to attach a new reel around which unused cleaning tape is wound and a reel for taking up the used cleaning tape; therefore, replacement of the cleaning tape is extremely troublesome. Also, since the reel around which the cleaning tape is wound is directly handled, there is a drawback in that contaminants may easily stick to the cleaning tape.

Furthermore, in the aforesaid cleaning device, since the guide plate and the rubber pad are integrally fixed to the outer casing, it is difficult to replace them, posing a problem in that only optical connectors having a specific shape can be cleaned. In particular, recently, the shape of optical connectors has become more complicated. For example, an optical connector having guide pins beside the fiber end and so on has been put into practical use in order to achieve more reliable and tighter joining so that it is substantially impossible for the aforesaid cleaning device to clean optical connectors having a complicated shape.

DISCLOSURE OF INVENTION

An optical-connector cleaning device according to the present invention, in which an outer casing has an openable and closable window and cleaning tape for cleaning fiber end surface of the optical connector is gradually fed through the window, is characterized in that a cassette is configured for integrally holding a first reel for feeding unused cleaning tape and a second reel for taking up the used cleaning tape, the cassette being detachable from the outer casing.

An optical-connector cleaning device according to the present invention, in which an outer casing has an openable and closable window and cleaning tape for cleaning fiber end surface of the optical connector is gradually fed through the window, is characterized in that a replacement unit including a guide plate for guiding the fiber end surface of the optical connector and a rubber pad serving as a base for the cleaning tape is detachably disposed at a position corresponding to the window in the outer casing.

Figure 1:
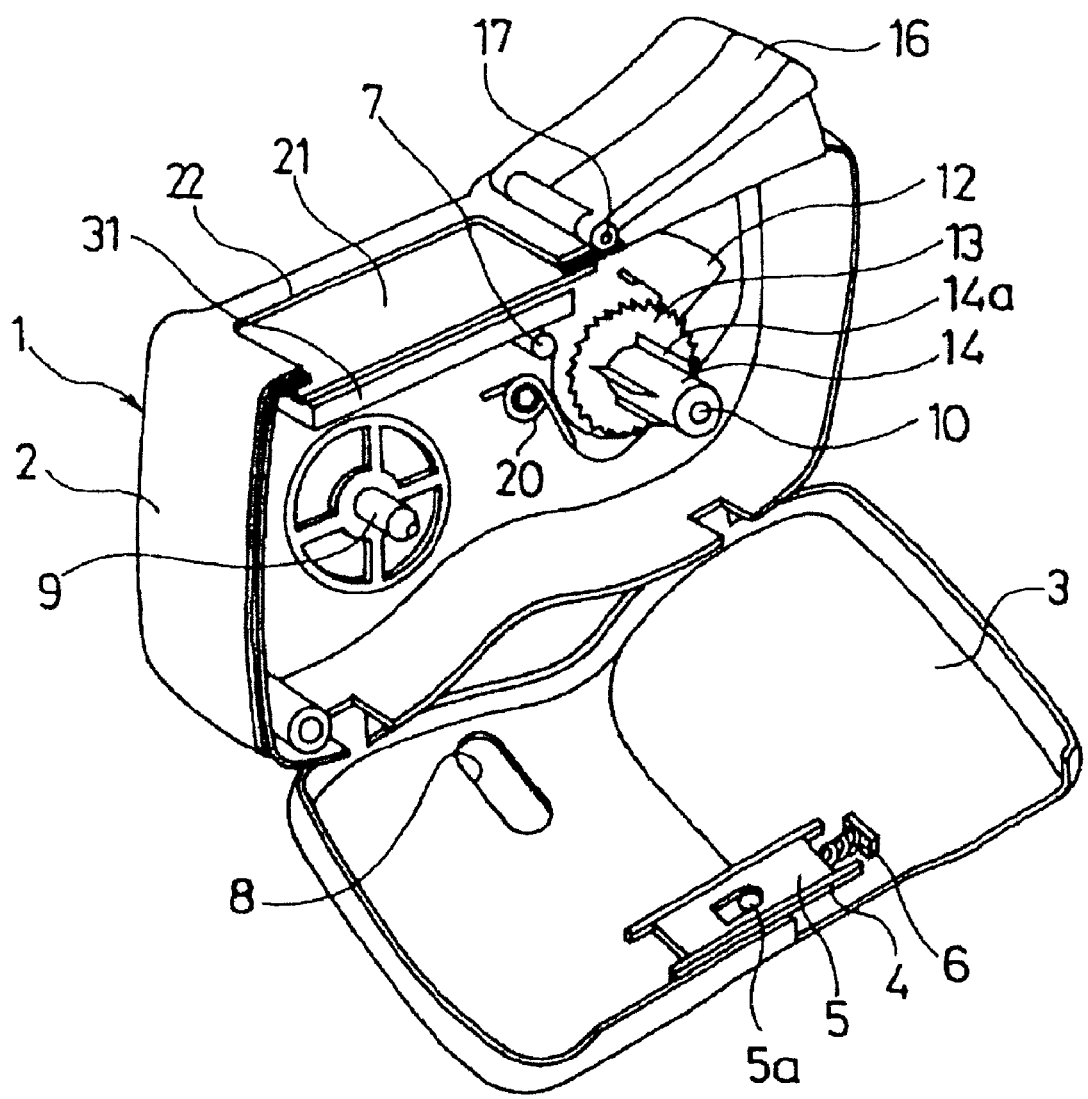
FIG. 1 is a perspective view of an embodiment of an outer casing of an optical-connector cleaning device according to the present invention.
Figure 2:
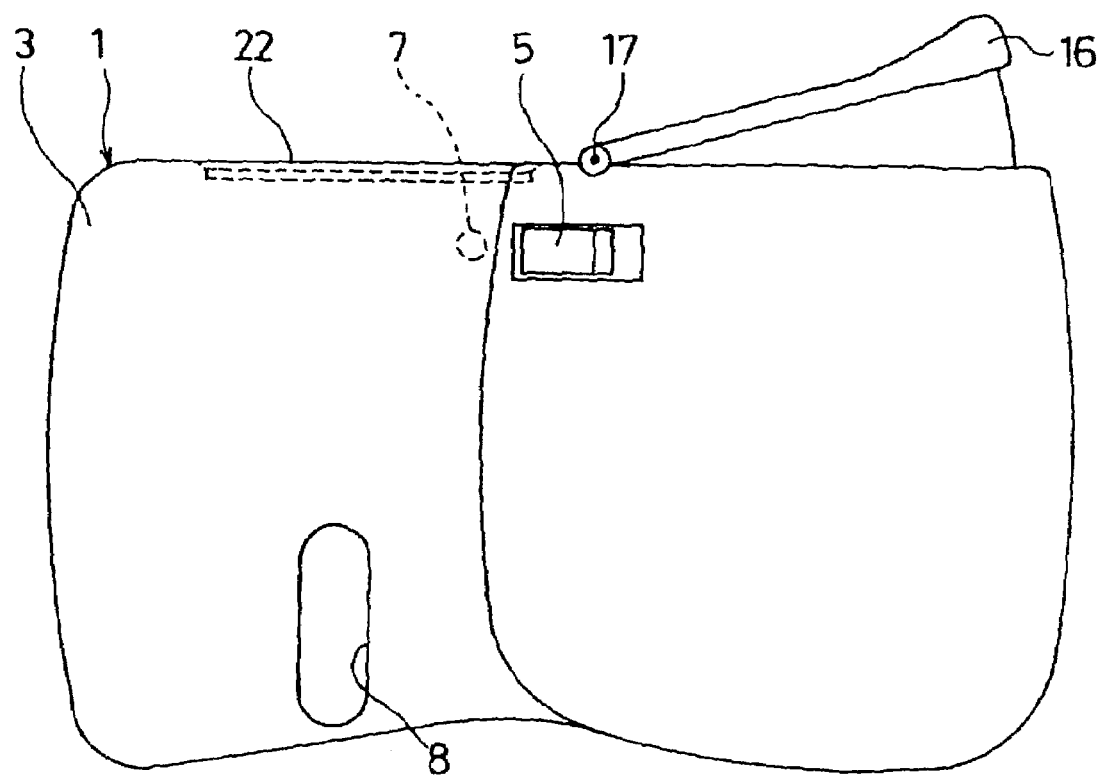
FIG. 2 is a side view of the embodiment of the outer casing of the optical-connector cleaning device according to the present invention.

REFERENCE NUMERALS 1 outer casing
2 casing main body
2a support section
3 lid
4 rail
5 slider
5a engagement hole
6 spring
7 pole
8 observation hole
9 support shaft
10 support shaft
11 pinion
12 rotating plate
12a retaining section
13 gearwheel
14 drive shaft
14a projecting striation
15 push plate
16 lever
17 rotating shaft
18 rack
19 guide pin 20 spring
21 shutter
22 window
23 bracket
31 replacement unit
32 guide plate
33 rubber pad
34 holder
34a engaging piece
35 slit
36 groove
37 projecting striation
41 cassette
41a tape exposing portion
42 side plate
42a engaging claw
43 side plate
43a engaging claw
44 peripheral wall
45 peripheral wall
46 connecting portion
48 opening
49 observation bay window
51 reel (first reel)
52 rotating cylinder
53 drum
54 side plate
55 gearwheel
61 reel (second reel)
62 rotating cylinder
63 drum
64 side plate
65 gearwheel
S cleaning tape

BEST MODE FOR CARRYING OUT THE INVENTION

The structure of the present invention will be specifically described hereinbelow with reference to the attached drawings.

FIGS. 1 to 11 show an optical-connector cleaning device according to an embodiment of the present invention. The cleaning device of this embodiment includes an outer casing 1, shown in FIGS. 1 to 3, and a cassette 41, shown in FIGS. 4 to 5.

The outer casing 1 has a configuration such that a lid 3 is connected to a casing main body 2 accommodating the cassette 41 such that it can rotate. The lid 3 includes a slider 5, which can be slid along a rail 4, and the slider 5 is biased in one direction by a spring 6. The slider 5 includes an engagement hole 5a. The engagement hole 5a is brought into engagement with the end of a pole 7 projecting into the interior of the casing main body 2 by an elastic force of the spring 6. Therefore, the outer casing 1 can be opened and closed by sliding the slider 5 from the exterior of the casing. Also, the lid 3 includes an observation hole 8 through which the remaining amount of the cleaning tape can be checked.

Figure 3:
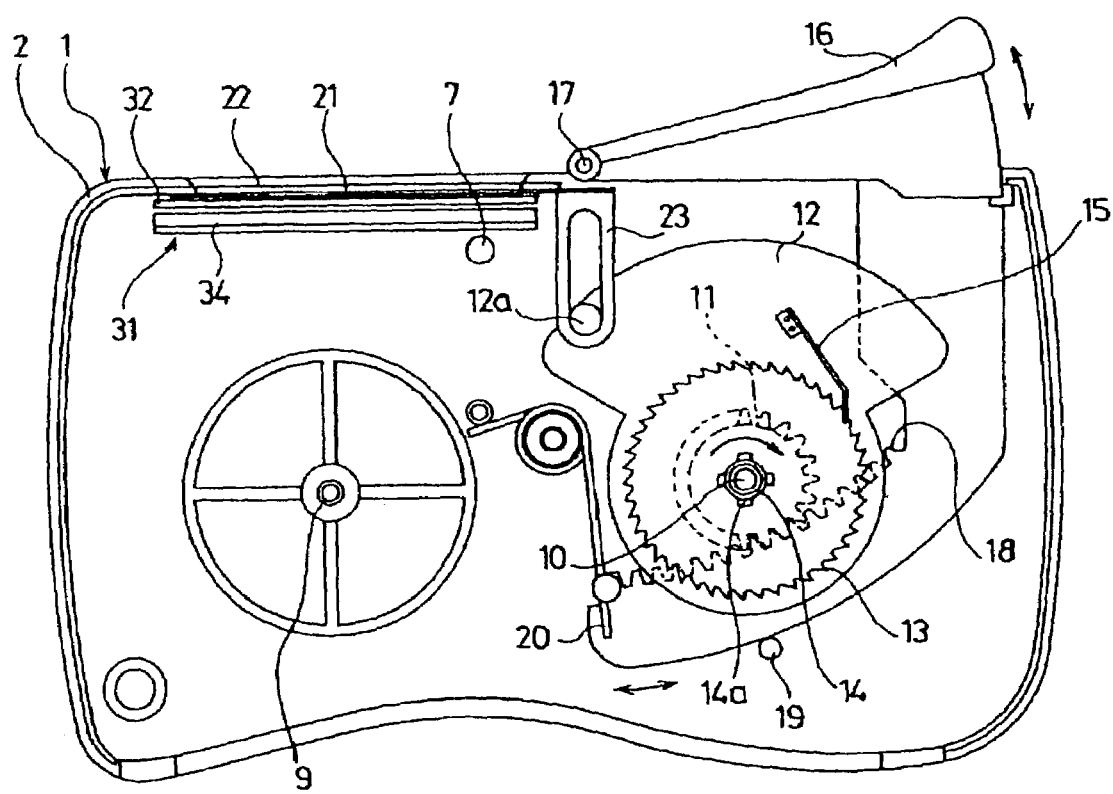
FIG. 3 is a side view showing the interior of the embodiment of the outer casing of the optical-connector cleaning device according to the present invention.

The outer casing 1 includes support shafts 9 and 10 disposed on the inside surface with a spacing therebetween. As shown in FIG. 3, the support shaft 10 includes a rotating plate 12 having a pinion 11 and a drive shaft 14 having a gearwheel 13 such that they are rotatably retained. The rotating plate 12 includes a push plate 15 that is engageable with the gearwheel 13 of the drive shaft 14 to rotate the drive shaft 14 only in one direction when repeatedly rotating around the shaft. Since the drive shaft 14, however, is biased toward the end thereof by a spring member (not shown), the gearwheel 13 is disengaged from the push plate 15 when the cassette 41 is not mounted in the outer casing 1, and thus, the drive shaft 14 can be rotated. Also, the drive shaft 14 has a plurality of projecting striations 14a extending in the axial direction on the peripheral surface thereof.

On the other hand, the outer casing 1 has a lever 16 on the outer casing 1 such that it can be turned around a rotating shaft 17. The lever 16 has a rack 18, which is engageable with the pinion 11, integrally attached thereto. The rack 18 rotates the pinion 11 while being guided by a guide pin 19 by the operation of the lever 16. Also, since the rack 18 is biased in one direction by a spring 20, the lever 16 projects from the outer casing 1 when no cassette is loaded. The lever 16 is designed to have a substantially symmetrical shape with respect to the outer casing 1 so as to easily be operated irrespective of the dominant hand.

The rotation of the lever 16 is converted to an intermittent one-directional rotation of the drive shaft 14 by a power transmission mechanism including the aforesaid rack 18, the pinion 11, the rotating plate 12, the push plate 15, and the gearwheel 13.

The outer casing 1 includes a window 22 having a shutter 21 made of a metallic thin plate, at the upper part thereof. The shutter 21 has a bracket 23 having an elliptic opening at the rear end thereof, the bracket 23 being connected to a retaining section 12a of the rotating plate 12. Therefore, when the lever 16 is pushed to rotate the rotating plate 12, the shutter 21 is slid under the lever 16 to thereby open the window 22.

Figure 6:
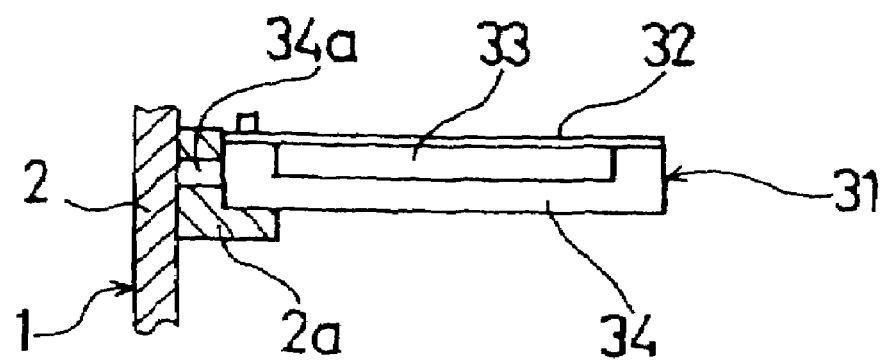
FIG. 6 is a sectional view of essential parts showing a support structure of a replacement unit.
Figure 7:
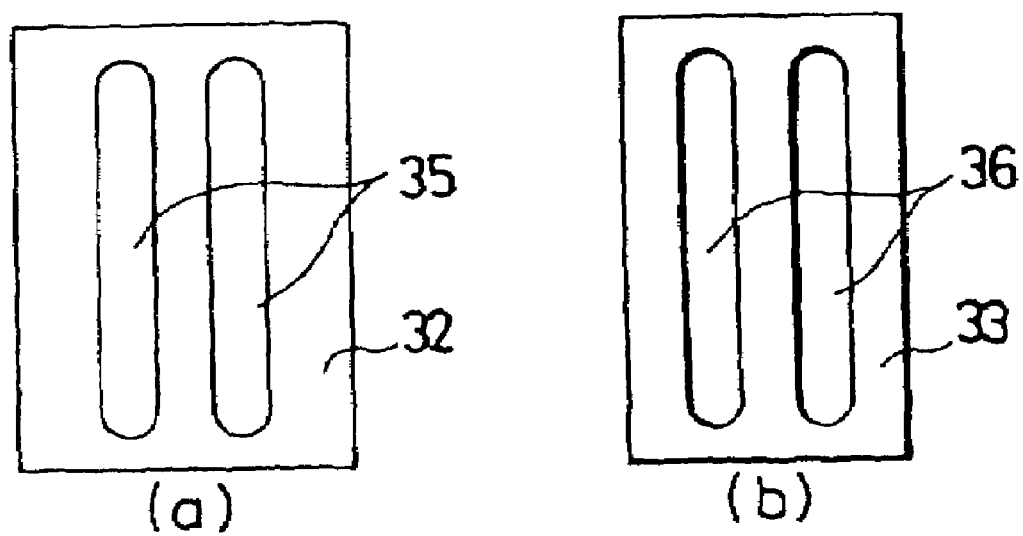
FIGS. 7(a) and (b) shows an example of the replacement unit, wherein (a) is a plan view of a guide plate and (b) is a plan view of a rubber pad.
Figure 8:
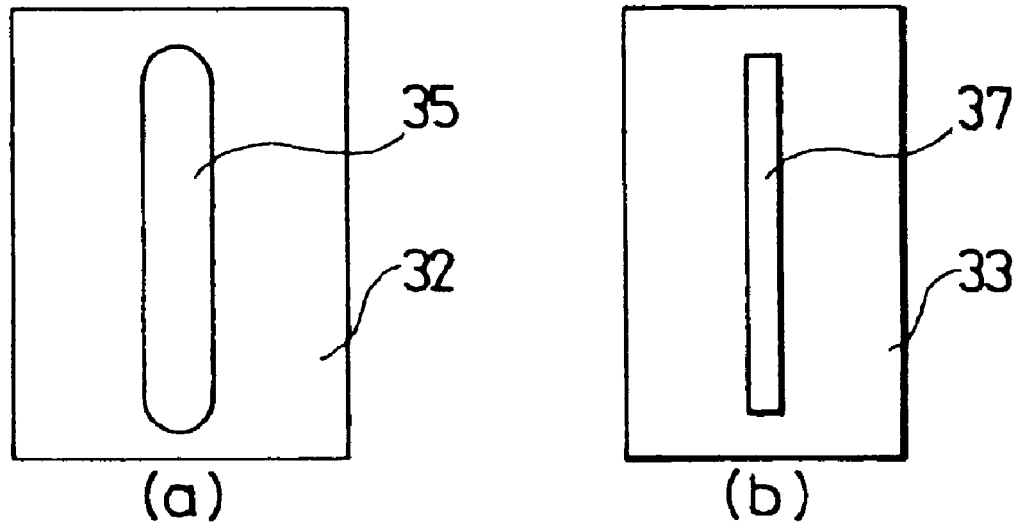
FIGS. 8(a) and (b) shows an example of a replacement unit different from that in FIG. 7, wherein (a) is a plan view of a guide plate and (b) is a plan view of a rubber pad.
Figure 9:
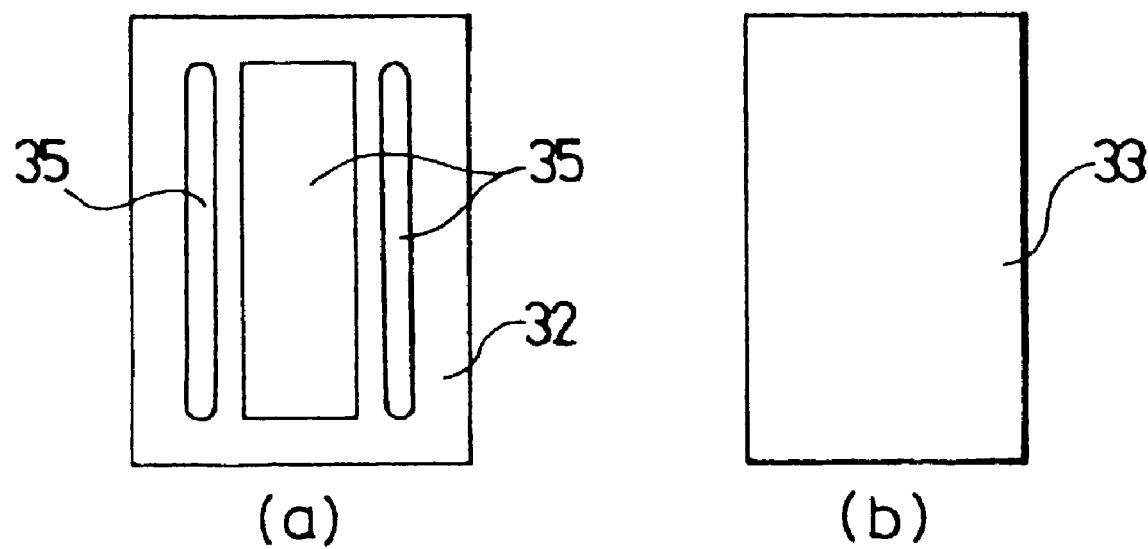
FIGS. 9(a) and (b) show an example of a replacement unit different from those in FIGS. 7 and 8, wherein (a) is a plan view of a guide plate and (b) is a plan view of a rubber pad.

The outer casing 1 includes a replacement unit 31 having a guide plate 32 for guiding the fiber end surface of the optical connector and a rubber pad 33 serving as a base for the cleaning tape, detachably mounted at a position corresponding to the window 22. As shown in FIG. 6, the replacement unit 31 accommodates the rubber pad 33 in a recessed portion of a holder 34 and only one side of the guide plate 32 is fixed to the rim of the holder 34. The holder 34 includes an engaging piece 34a at the side thereof, which is brought into engagement with a support section 2a of the case main body 2, thereby being arranged at the position corresponding to the window 22.

Several types of replacement units 31 are prepared, any one of which is selected depending on the type of optical connector. For example, as shown in FIG. 7(a), a combination of the guide plate 32 having two slits 35 and the rubber pad 33 having two grooves 36 corresponding to the slits 35 may be used. Also, as shown in FIG. 8(a), a combination of the guide plate 32 having one slit 35 and the rubber pad 33 having one projecting striation 37 that is narrower than the slit 35 may be used. Such units are effective in cleaning an optical connector having guide pins beside the fiber end surface. Furthermore, as shown in FIG. 9(a), a combination of the guide plate 32 having three slits 35 of different widths and a flat rubber pad 33 may be used. This unit can clean optical connectors of different sizes.

Although the material of the rubber pad 33 is not particularly limited, it is preferable that the rubber pad has a JIS-A hardness of 55 to 80, more preferably, 60 to 80, in order that the optical-fiber cleaning effect of the cleaning tape is sufficient. If the rubber pad 33 serving as the base for the cleaning tape is too soft, this makes it difficult for the optical connector to slide on the cleaning tape, and conversely, if the rubber pad 33 is too hard, this provides an insufficient optical-connector cleaning effect.

Figure 4:
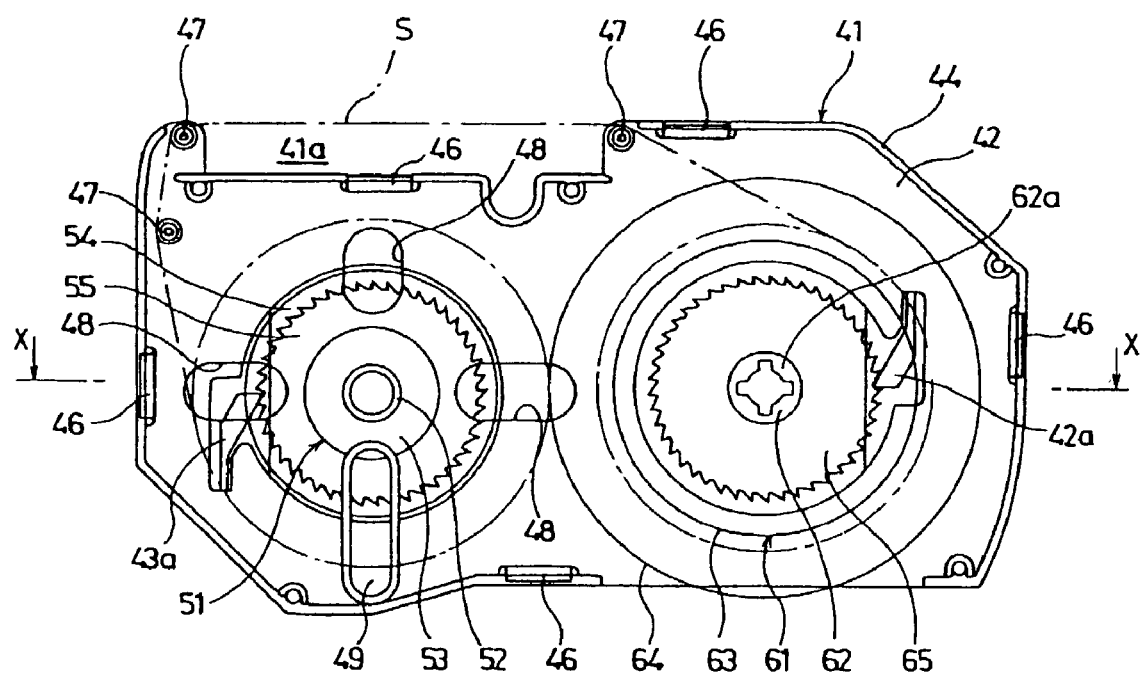
FIG. 4 is a side view of an embodiment of a cassette in the optical-connector cleaning device according to the present invention.
Figure 5:
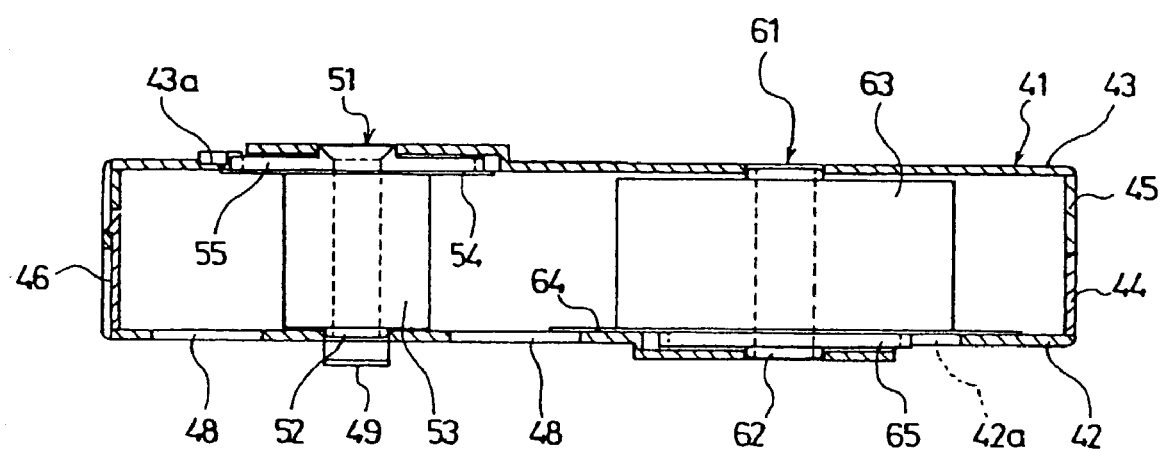
FIG. 5 is a sectional view taken along line X—X in FIG. 4.

Meanwhile, as shown in FIGS. 4 and 5, the cassette 41 is configured to integrally hold a reel 51 (first reel) for feeding cleaning tape S that has not been used and a reel 61 (second reel) for taking up the cleaning tape S that has been used. Referring to FIG. 4, since a part of the component of the cassette 41 is formed of a transparent or translucent material, the outline is projected.

The cassette 41 has peripheral walls 44 and 45 attached to the edges of side plates 42 and 43, respectively, and the peripheral walls 44 and 45 are connected to each other through a plurality of connecting portions 46. The side wall 42 and the peripheral wall 44 may be integrally formed and the side wall 43 and the peripheral wall 45 may be integrally formed. Also, the cassette 41 has a tape exposing portion 41a at the upper part thereof for exposing the cleaning tape S. The cleaning tape S unwound from the reel 51 passes through the tape exposing portion 41a while being guided by a plurality of rollers 47 and reaches the reel 61.

For the cleaning tape S, it is preferable to use cloth. The fiber forming the cloth is not particularly limited, however, a micro-fiber filament string having a single-fiber fineness of 0.0001 to 1.0 dtex is preferably used. Cloth made of such micro-fiber filament strings can demonstrate an excellent cleaning effect on the fiber end surface. The upper limit of the single-fiber fineness is more preferably 0.5 dtex or less, and more preferably 0.1 dtex or less. The micro-fiber filament string may be either a non-twisted thread or a twisted thread. Preferably, the weaving structure is plain.

There are no special limitations on the polymer constituting the micro-fiber filament string as long as it has fiber-forming properties, such as polyester and nylon. The filament may have a normal circular cross section, however, it is particularly preferable that it has a modified cross-section or is crimped, thereby obtaining an improved cleaning effect.

The reel 51 for feeding the unused cleaning tape S includes a drum 53 at the periphery of a rotating cylinder 52, around which the cleaning tape S is to be wound, and a side plate 54 and a gearwheel 55 at one end of the drum 53, and the rotating cylinder 52 is inserted into openings formed in the side plates 42 and 43, thus being allowed to rotate. The side plate 43 includes an engaging claw 43a that is engageable with the gearwheel 55, and the rotating direction of the reel 51 is controlled in one direction by the engaging claw 43a.

The side plate 42 of the cassette 41 includes a plurality of openings 48, through which alcohol is injected, at positions corresponding to the cleaning tape S wound around the reel 51. The cleaning tape S can be impregnated with alcohol as necessary through the openings 48. The side plate 42 has also an observation bay window 49 for use in checking the remaining amount of the cleaning tape S. The observation bay window 49 is arranged to be fitted in the observation hole 8 of the outer casing 1.

The reel 61 for taking up the used cleaning tape S has a drum 63 at the periphery of a rotating cylinder 62, around which the cleaning tape S is to be wound, and has a side plate 64 and a gearwheel 65 at one end of the drum 63, and can be rotated by inserting the rotating cylinder 62 into openings formed in the side plates 42 and 43. The side plate 42 includes an engaging claw 42a that is engageable with the gearwheel 65, and the rotating direction of the reel 61 is controlled in one direction by the engaging claw 42a.

Figure 10:
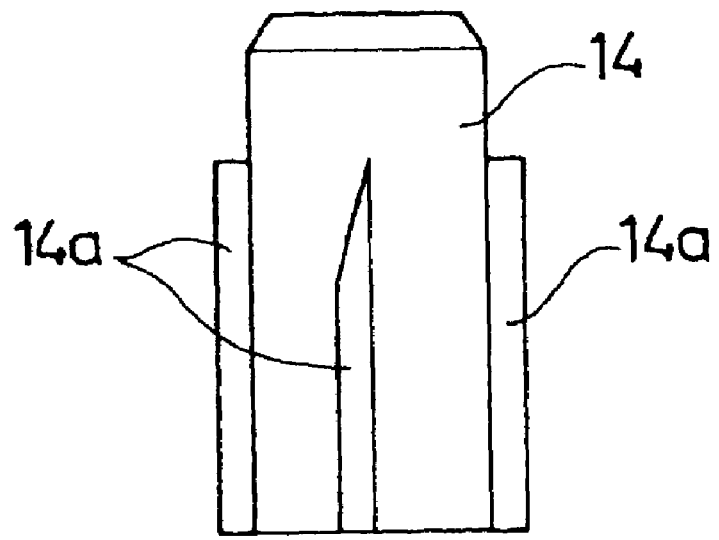
FIG. 10 is a side view of a drive shaft of the outer casing.
Figure 11:
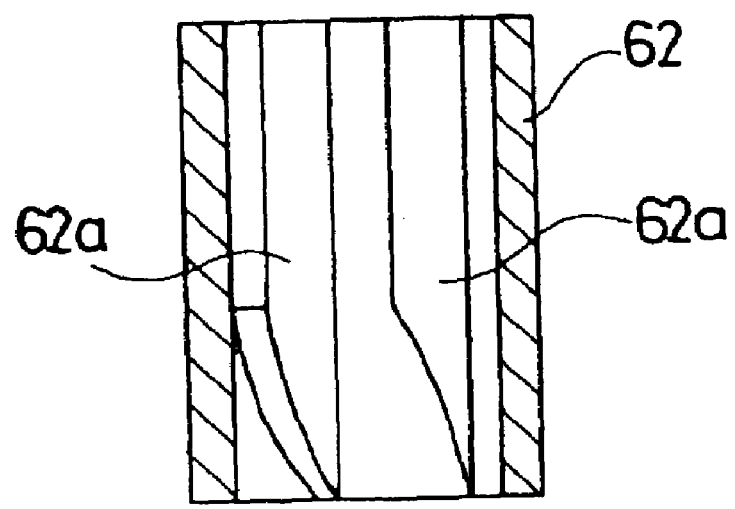
FIG. 11 is a sectional view showing the interior of a rotating cylinder of a reel into which the drive shaft is to be inserted.

The rotating cylinder 62 of the reel 61 is fitted on the drive shaft 14 of the outer casing 1 and is driven to rotate. For this purpose, the inner peripheral surface of the rotating cylinder 62 of the reel 61 includes a plurality of projecting striations 62a formed to extend along the axis thereof. As shown in FIG. 10, the projecting striations 14a formed on the outer periphery of the drive shaft 14 each have a shape wherein the end is beveled off in the axial direction. On the other hand, as shown in FIG. 11, the projecting striations 62a formed on the inner periphery each have a shape wherein the end is beveled off in the axial direction. Therefore, when the cassette 41 is mounted, the end faces of the projecting striations 14a of the drive shaft 14 and the end faces of the projecting striations 62a of the rotating-cylinder 62 are not brought into contact with each other, whereby the drive shaft 14 easily enters the rotating cylinder 62.

Subsequently, the usage of the aforesaid optical-connector cleaning device will be discussed. First, the outer casing 1 is opened, and the cassette 41 is inserted therein. At this time, the rotating cylinder 52 of the reel 51 for tape feeding is fitted on the support shaft 9, while the rotating cylinder 62 of the reel 61 for taking-up the tape is fitted on the drive shaft 14. The cleaning tape S exposed at the tape exposing portion 41a of the cassette 41 is inserted between the guide plate 32 and the rubber pad 33 of the replacement unit 31. After the cassette 41 has been mounted in this way, the outer casing 1 is closed.

When the optical connector is cleaned, the lever 16 is pushed to open the shutter 21 of the window 22 and, at the same time, the reel 61 is rotated at a predetermined angle by the rotation of the drive shaft 14 to take up the cleaning tape S around the reel 61, while the unused cleaning tape S fed from the reel 51 is moved past the window 22. In this state, the optical connector is cleaned in such a way that it is rubbed on the cleaning tape S along the slit(s) 35 of the guide plate 32 with the rubber pad 33 serving as a base.

When a specific optical connector is cleaned, it is sufficient to repeat the above operation. However, when several types of optical connectors having different shapes are cleaned, it is recommended that after the replacement plate 31 having the guide plate 32 and the rubber pad 33 has been replaced depending on the shape of the optical connector, as appropriate, an operation similar to the above be performed. Consequently, not only general optical connectors in which a fiber end surface is exposed at the end of a ferrule but also optical connectors each having a guide pins or duplex-type optical connectors can also be cleaned.

When the cleaning tape S in the cassette 41 has been used up, it is recommended that after the outer casing 1 has been opened, the cassette 41 be taken out, and then a new cassette 41 be mounted. In the aforesaid optical-connector cleaning device, the cleaning tape S can easily be replaced by replacing the whole cassette. Also, since the cleaning tape S is held in the cassette along with the reels 51 and 61, it is difficult for contaminants to stick to the cleaning tape S.

Although, in the above embodiment, a cleaning device of the type in which the cleaning tape is replaced by replacing the whole cassette was described, the invention can also be applied to a cleaning device of the type in which the cleaning tape is replaced by replacing the reels.

In the invention, a replacement unit having a guide plate for guiding a fiber end surface of an optical connector and a rubber pad serving as a base for cleaning tape is detachably disposed at a position corresponding to a window in an outer casing, so that the shapes of the guide plate and the rubber pad can be varied depending on the type of optical connector. In other words, it is recommended that several types of replacement units may be prepared, any one of which may be selected depending on the type of optical connector.

The outer casing includes a rotating lever and a power transmission mechanism for converting the rotation of the lever into one-directional rotation of the drive shaft and a second reel of a cassette is rotated by a predetermined rotation angle by the rotation of the drive shaft, whereby even cassette-type cleaning tape can be gradually fed without any trouble. Moreover, the lever can be arranged symmetrically with respect to the outer casing, allowing easy operation irrespective of the dominant hand.

Furthermore, when the drive shaft provided in the outer casing includes a plurality of projecting striations on the outer periphery thereof extending in the axial direction thereof, and a rotating cylinder of a second reel, into which the drive shaft is to be inserted, has a plurality of projecting striations extending in the axial direction thereof, on the inner peripheral surface thereof, and the ends of which are beveled off in the axial direction, the drive shaft of the outer casing can easily enter the rotating cylinder of the second reel when mounting the cassette, thus further facilitating replacement of the cleaning tape.

It is preferable to provide openings for alcohol injection at positions corresponding to the cleaning tape wound around the first reel of the cassette. Providing such openings allows the cleaning tape to be impregnated with alcohol if necessary.

Also, since a replacement unit having a guide plate for guiding a fiber end surface of an optical connector and a rubber pad serving as a base for the cleaning tape is detachably disposed at a position corresponding to the window in the outer casing, the shapes of the guide plate and the rubber pad can be varied depending on the type of optical connector, thus facilitating the cleaning of optical connectors having various shapes. As for the replacement unit, it is recommended that several types of replacement units be prepared and any one of the replacement units be selected depending on the type of optical connector.

INDUSTRIAL APPLICABILITY

According to the present invention, in an optical-connector cleaning device in which an outer casing has an openable and closable window, through which a cleaning tape for cleaning fiber end surface of the optical connectors is gradually fed, a cassette integrally holding a first reel for feeding unused cleaning tape and a second reel for taking up the used cleaning tape is configured, and the cassette can be attached to and detached from the outer casing, thus facilitating replacement of the cleaning tape.

Also, since the cassette integrally holds the first reel for tape feeding and the second reel for tape take-up, and can be attached to and detached from the outer casing, the cleaning tape can easily be replaced by replacing the whole cassette. Moreover, since the cleaning tape is held in the cassette along with the reel, contaminants rarely stick to the cleaning tape.

Furthermore, according to the invention, since a replacement unit having a guide plate for guiding a fiber end surface of an optical connector and a rubber pad serving as a base for the cleaning tape is detachably disposed at a position corresponding to the window in the outer casing, the shapes of the guide plate and the rubber pad can be varied depending on the type of optical connector, thus facilitating the cleaning of optical connectors having various shapes.

The invention claimed is:

1. An optical-connector cleaning device comprising:
   an outer casing having an openable and closable window through which a cleaning tape for cleaning fiber end surfaces of optical connectors is gradually fed;
   a cassette integrally holding a first reel for feeding unused cleaning tape and a second reel for taking up used cleaning tape that is sized and shaped to be removeably placed in the outer casing; and
   a gearwheel and an engaging claw in the cassette that controls rotational direction of said second reel in one direction.

2. The optical-connector cleaning device according to claim 1, further comprising a plurality of detachable replacement units including a guide plate for guiding the fiber end surface of the optical connector and a rubber pad having a JIS-A hardness of 55 to 80 and serving as a base for the cleaning tape is detachably disposed at a position corresponding to the window in the outer casing, wherein the replacement units are selected depending on the optical connector.

3. The optical-connector cleaning device according to claim 1, further comprising a drive shaft provided in the outer casing and having a plurality of projecting striations on an outer periphery thereof, the striations extending in an axial direction of the drive shaft, wherein a rotating cylinder of the second reel, into which the drive shaft is to be inserted, has a plurality of projecting striations on an inner periphery thereof, the striations of the second reel extending in an axial direction of the rotating cylinder, and wherein ends of the projecting striations of the drive shaft and the second reel are beveled off in the axial directions.

4. The optical-connector cleaning device according to claim 2, wherein the guide plate connects to one side of a holder connected to the outer casing.

5. The optical-connector cleaning device according to claim 4, further comprising a support section on the outer casing sized and shaped to connect to the holder.

6. The optical-connector cleaning device according to claim 5, further comprising an engaging piece connected to the holder sized and shaped to engage the support section.

7. An optical-connector cleaning device comprising:
   an outer casing having an openable and closable window through which a cleaning tape for cleaning fiber end surfaces of optical connectors is gradually fed;
   a cassette integrally holding a first reel for feeding unused cleaning tape and a second reel for taking up used cleaning tape that is sized and shaped to be removeably placed in the outer casing;
   a gearwheel in the cassette that controls rotational direction of said second reel in one direction; and
   a drive shaft provided in the outer casing and having a plurality of projecting striations on an outer periphery thereof, the striations of the second reel extending in an axial direction of the drive shaft, wherein a rotating cylinder of the second reel, into which the drive shaft is to be inserted, has a plurality of projecting striations on an inner periphery thereof, the striations of the second reel extending in an axial direction of the rotating cylinder, and wherein ends of the projecting striations of the drive shaft and the second reel are beveled off in the axial directions.

8. An optical-connector cleaning device comprising:
   an outer casing having an openable and closable window through which a cleaning tape for cleaning fiber end surfaces of optical connectors is gradually fed, and
   a detachable replacement unit comprising
   1) a guide plate for guiding a fiber end surface of the optical connector, which connects to a holder connected to the outer casing, and
   2) a rubber pad serving as a base for the cleaning tape disposed at a position corresponding to the window in the outer casing.

9. The optical-connector cleaning device according to claim 8, wherein the guide plate connects to one side of the holder.

10. An optical-connector cleaning device comprising:
an outer casing having an openable and closable window through which a cleaning tape for cleaning fiber end surfaces of optical connectors is gradually fed, and
a detachable replacement unit comprising
1) a guide plate for guiding a fiber end surface of the optical connector,
2) a rubber pad serving as a base for the cleaning tape disposed at a position corresponding to the window in the outer casing, and
3) a support section on the outer casing sized and shaped to connect to a holder for the guide plate.

11. The optical-connector cleaning device according to claim 10, further comprising an engaging piece connected to the holder sized and shaped to engage the support section.

* * * * *

UNITED STATES PATENT AND TRADEMARK OFFICE
CERTIFICATE OF CORRECTION

PATENT NO. : 7,216,393 B2 Page 1 of 1
APPLICATION NO. : 10/221542
DATED : May 15, 2007
INVENTOR(S) : Sato et al.

It is certified that error appears in the above-identified patent and that said Letters Patent is hereby corrected as shown below:

On the Title Page:
Please insert the Foreign Applications data as follows:
--Japan 2001-9188  01/17/2001--
--Japan 2001-9190  01/17/2001--.

In Column 2:
At line 29, please change "shows" to --show--; and at line 32, please change "shows" to --show--.

Signed and Sealed this

Seventh Day of August, 2007

JON W. DUDAS
*Director of the United States Patent and Trademark Office*